United States Patent Office 3,462,822
Patented Aug. 26, 1969

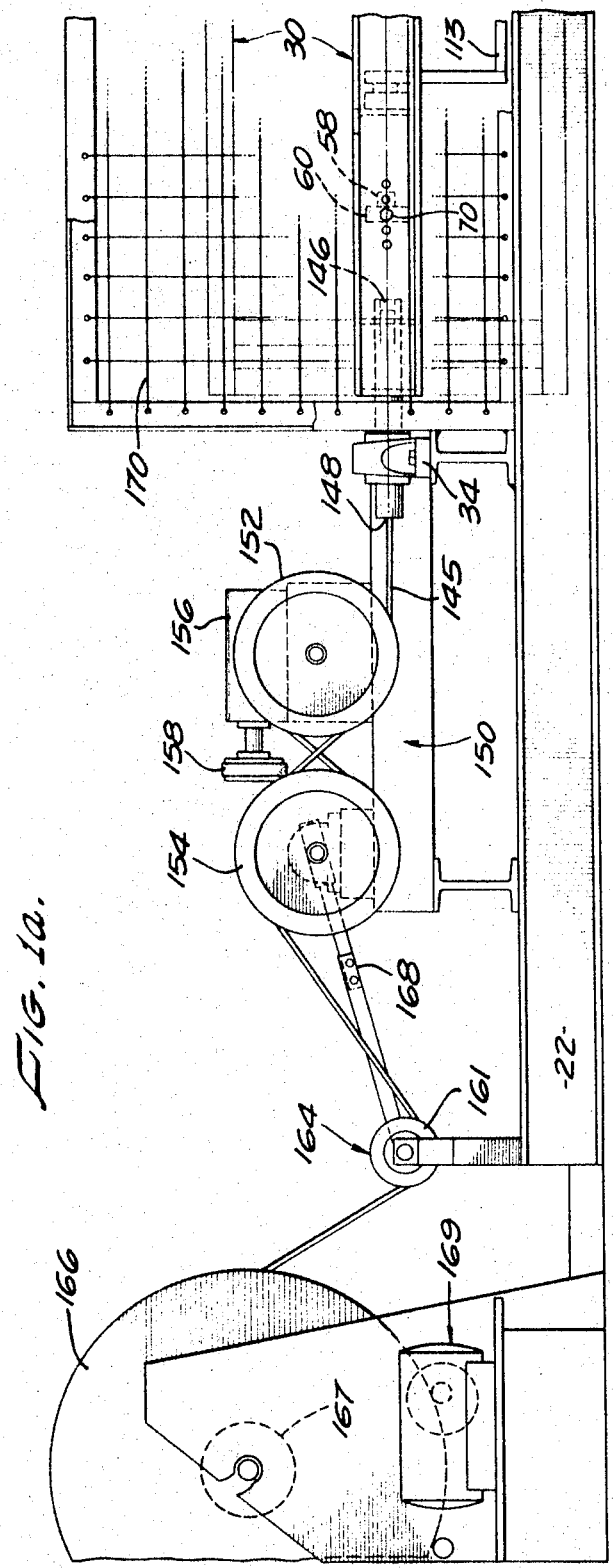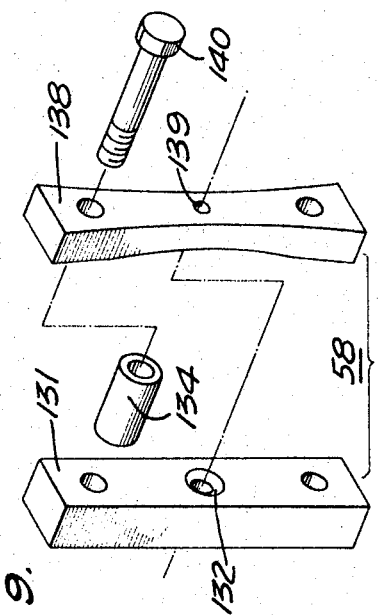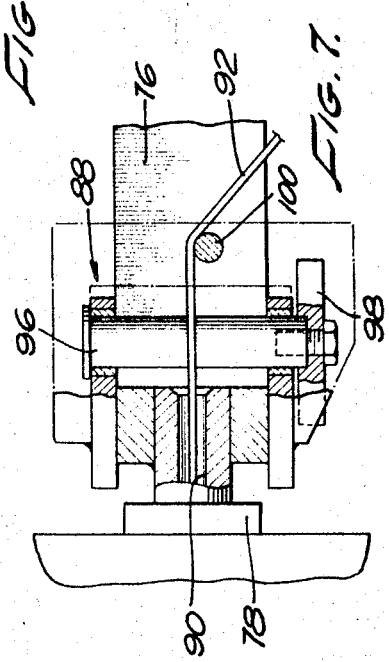

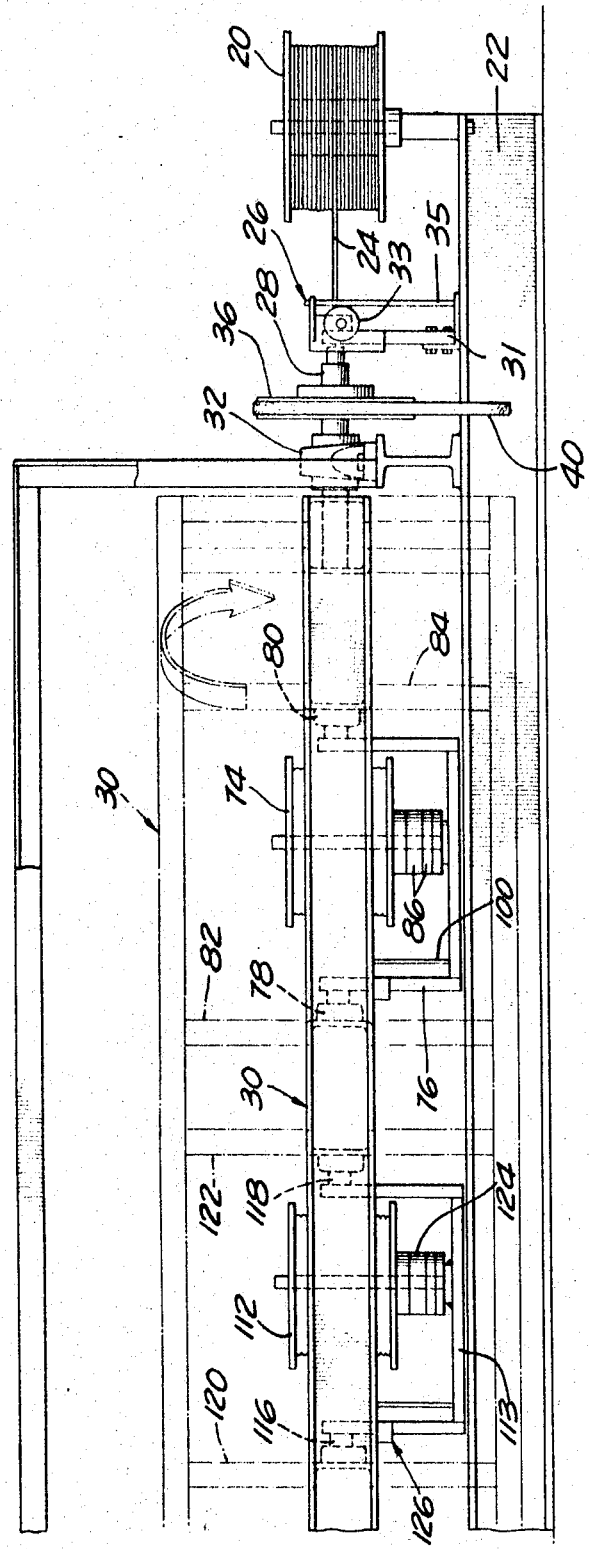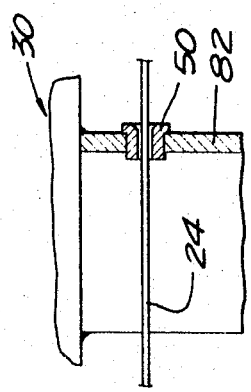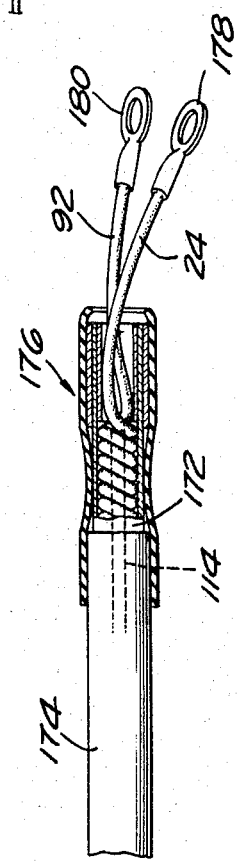

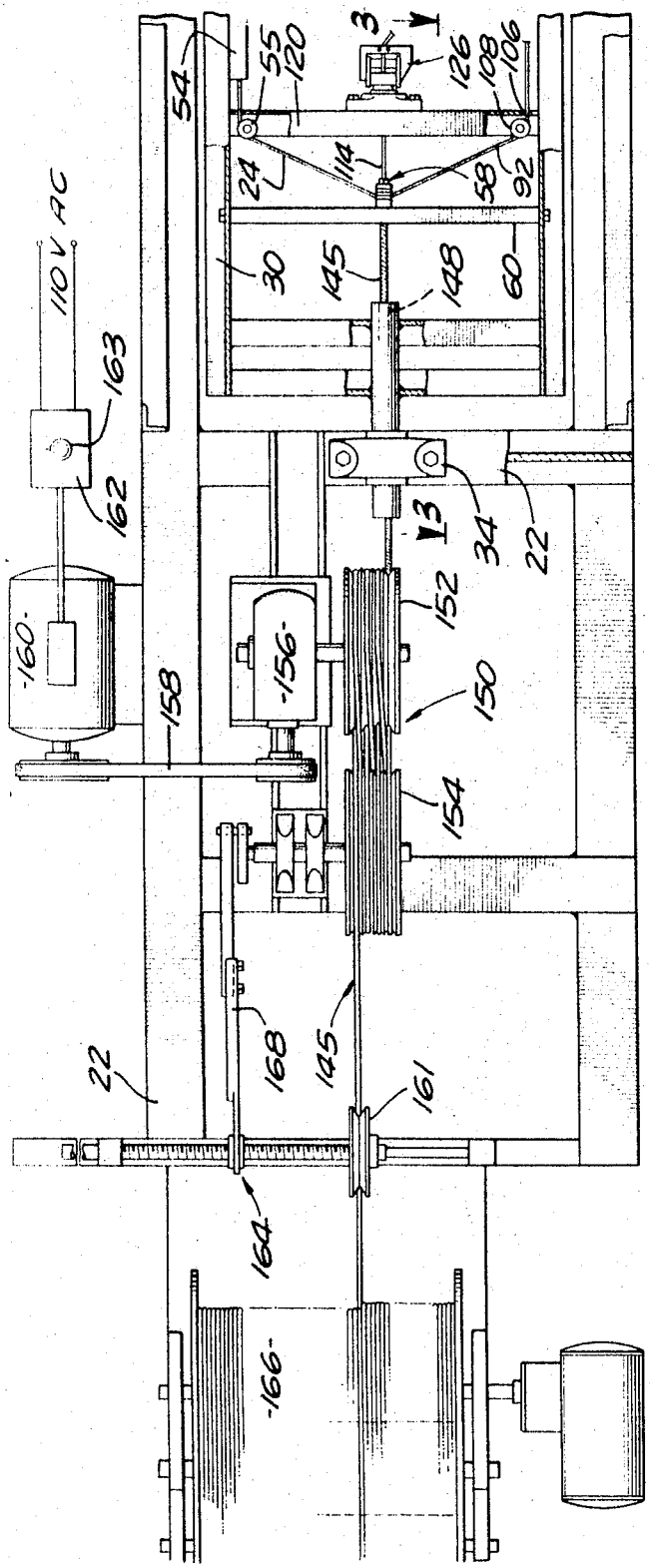
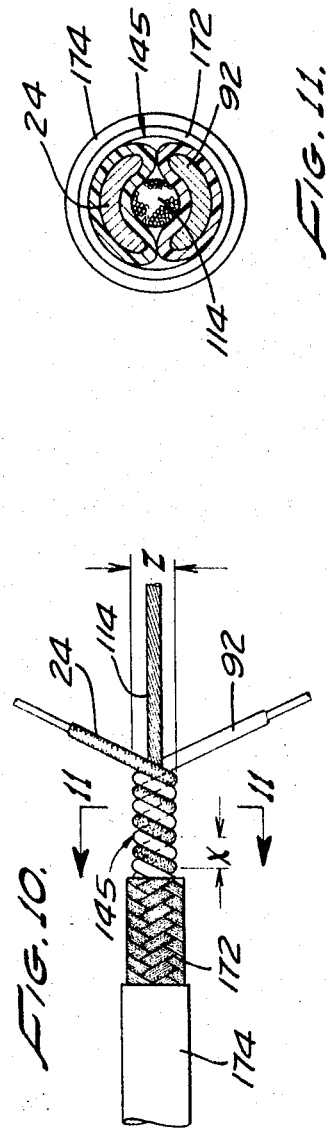
NORMAN P. ROE
INVENTOR.
BY Beehler & Arant
ATTORNEYS

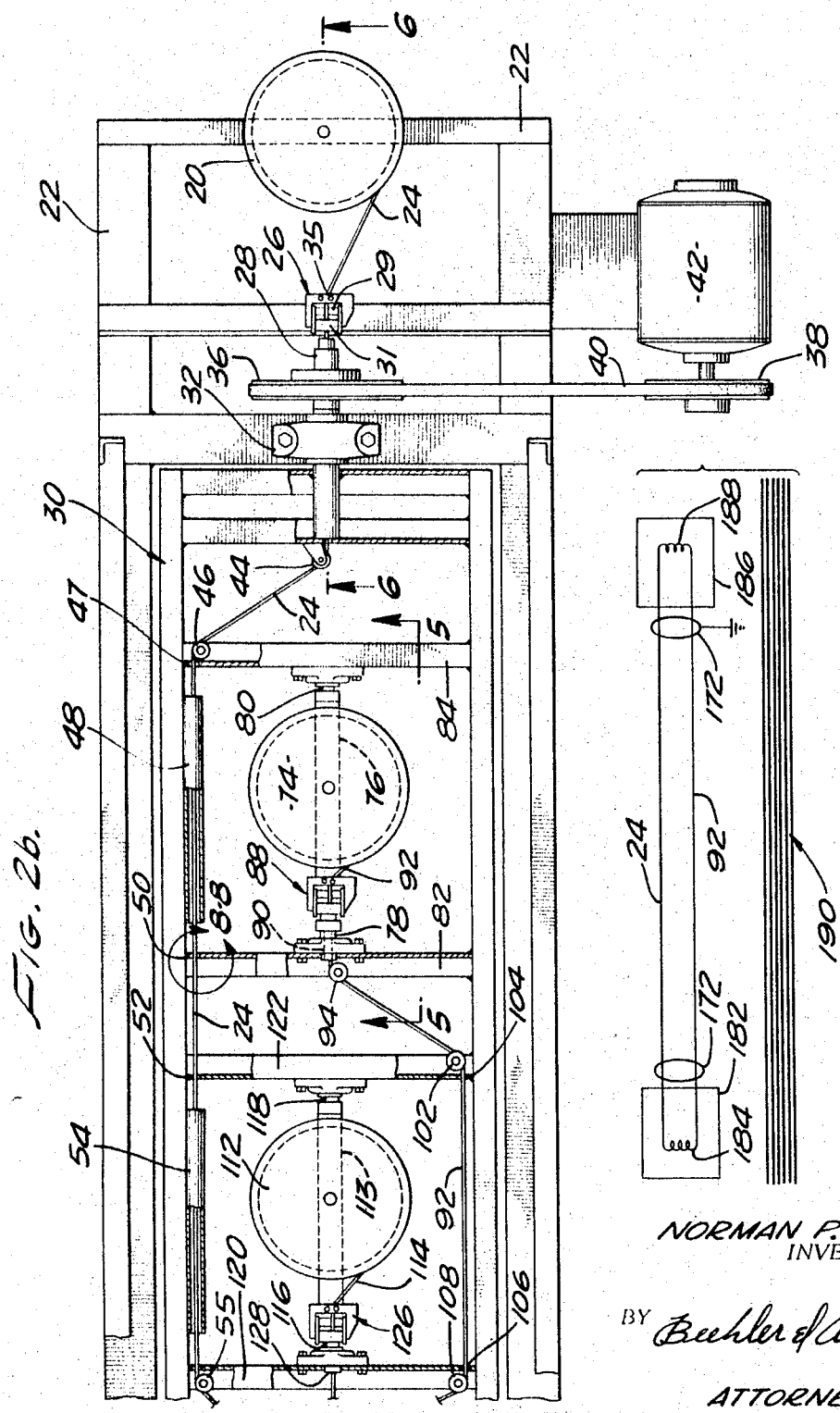

3,462,822
MACHINE FOR MANUFACTURING
LOW-NOISE CABLE
Norman P. Roe, El Monte, Calif., assignor, by mesne assignments, to Consolidated Products Corp., Gardena, Calif., a corporation of California
Filed Nov. 9, 1967, Ser. No. 681,820
Int. Cl. B23p *19/04;* H01r *43/00*
U.S. Cl. 29—202.5                13 Claims

ABSTRACT OF THE DISCLOSURE

A machine for assembling a plurality of insulated conductors wound about a cable core to form a low-noise cable. The machine includes a frame rotatably mounted on a base; and a wrapping die carried by said frame for simultaneously winding the plurality of insulated conductors nearly perpendicular to the longitudinal axis of the core. Means are provided for feeding the cable core through a port formed in the die, and for feeding each of the plurality of conductors across angled surfaces of the die; whereby as the cable is drawn through the machine the conductors are wound on the core at a low lay ratio.

Background of the invention

This invention relates to machines for manufacturing a low-noise cable and particularly to machines for manufacturing a low-noise cable which has a cylindrical cable core with insulated conductors wound helically about the core.

It is well known in the art that twisting or helically winding of a pair of conductors which are used as the outgoing and return conductors of a single circuit results in decreased susceptibility of that circuit to external noise. The conventional practice is to twist the conductors so as to form helices having a lay ratio of between four-to-one and eight-to-one, where the lay ratio is defined as the length of the helix divided by the pitch diameter of the helix. However it has recently been discovered that if conductors are helically wound about a cable core with a lay ratio of about one-to-one or less, that the resulting cable exhibits marked improvement in immunity to noise signal pickup. Therefore a machine for automatically manufacturing a cable having insulated conductors helically wound about a core with a lay ratio of one-to-one or less would be a significant advancement in the art.

Summary of the invention

Briefly the subject invention is a machine for automatically manufacturing a low-noise cable which comprises a plurality of insulated conductors wound helically about a cable core so that every turn of each conductor is nearly perpendicular to the longitudinal axis of the cable core. The machine of the subject invention includes a capstan driven at an adjustable rate for drawing the cable through the machine. A wrapping die is adjustably mounted on rotatable main frame, and guide means direct the insulated conductor across angled guide surfaces of the wrapping die. The wrapping die has an aperture formed therein along the axis of rotation of the main frame through which the cable core is drawn so that the insulated conductors are helically wound about the cable as the main frame rotates. The lay ratio of the helices formed by the conductors varies as a function of the position of the wrapping die relative to the guide means, of the angle of the wrapping die guide surfaces, and of the rotational speed of the capstan.

One object of the invention, therefore, is to provide a new and novel machine for manufacturing an improved low-noise cable.

Another object of the invention is to provide a machine for automatically manufacturing a low-noise cable that comprises a plurality of insulated conductors wound helically about a cable core so that every turn of each conductor is nearly perpendicular to the longitudinal axis of the cable core.

A further object of the subject invention is to provide a machine for manufacturing a low-noise cable that comprises a plurality of insulated conductors wound helically about a cable core so that the lay ratio of the helices formed by the conductors about the core is readily adjustable.

Brief description of the drawings

The objects and advantages of the invention will be more fully apparent from the following description considered in conjunction with the accompanying drawings in which:

FIGURES 1a and 1b are side elevational views of the machine for manufacturing a low-noise cable in accordance with the invention;

FIGURES 2a and 2b are plan views of the machine for manufacturing a low-noise cable in accordance with the invention;

FIGURE 3 is an elevational cross-sectional view taken on the line 3—3 of FIGURE 2a;

FIGURE 7 is a horizontal cross-sectional view taken from above on the line 7—7 of FIGURE 5;

FIGURE 8 is a vertical cross-sectional view taken on the line 8—8 of FIGURE 2b;

FIGURE 9 is a perspective view of the wrapping die of FIGURES 2, 3 and 5;

FIGURE 10 is a partially cut away perspective view of a low-noise cable produced by the machine of the present invention;

FIGURE 11 is a transverse cross-sectional view taken on line 11—11 of FIGURE 10;

FIGURE 12 is a partially cut away perspective view of the cable produced by the machines of the present invention showing connectors attached to the conductors;

FIGURE 13 is an electrical block and schematic diagram of an equipment installation utilizing the cable produced by the machine of the present invention.

Description of the preferred embodiment

Figure 6:
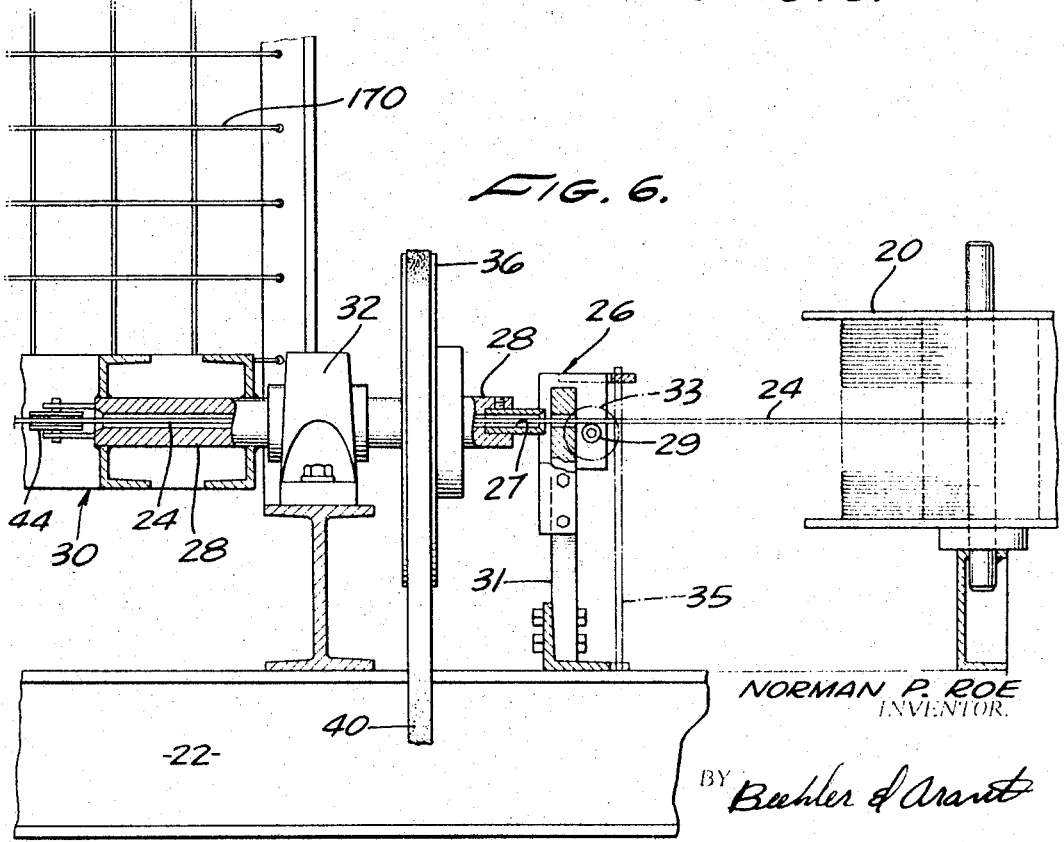
FIGURE 6 is a cross-sectional view taken on line 6—6 of FIGURE 2b.

Referring first primarily to FIGURES 1 and 2, a drum 20 is rotatably mounted on a base 22. The drum 20 is adapted to contain a quantity of a first insulated conductor 24 which is guided through a tension device 26, and through an aperture 27 (see FIGURE 6) formed in an axle 28 of a main rotating frame 30. As can be seen best in FIGURE 6, the tension device 26 includes a roller 29 rotatably mounted to a frame 31, with the roller 29 having a fly wheel 33 attached thereto for stabilizing the inertia of the roller. The cable 24 passes around a guide post 35 over the roller 29 and through the aperture formed in the axle 28. A pair of pillow blocks 32 and 34 are mounted on the base 22, and the main rotating frame 30 is rotatably mounted therebetween. The axle 28 carries a pulley 36 that is coupled to a pulley 38 by a belt 40. A constant speed motor 42 drives the pulley 38 at a predetermined constant rate.

Figure 4:
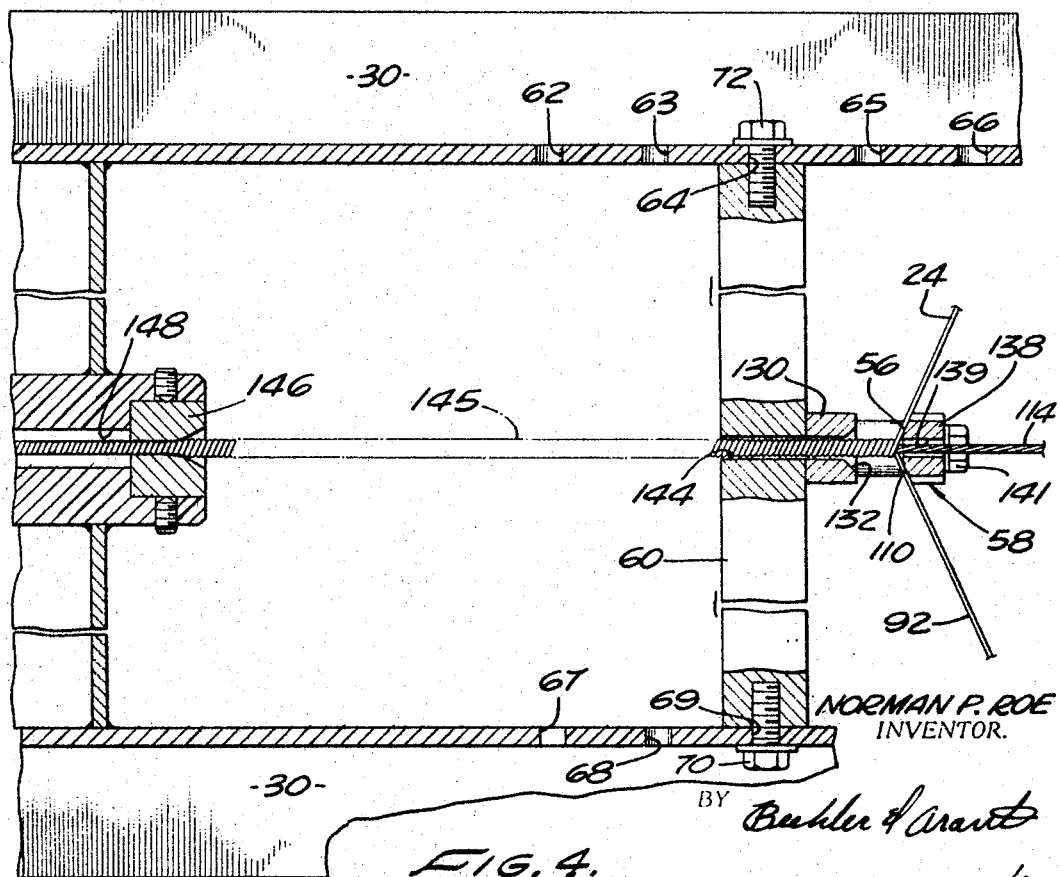
FIGURE 4 is a horizontal cross-sectional view taken from above on the line 4—4 of FIGURE 3.

The first insulated conductor 24, after passing through the aperture 27, is guided by guide pulleys 44 and 46, guide bushing 47, guide tube 48, guide bushings 50 and 52 (FIGURE 8), guide tube 54 and pulley 55 across an angled surface 56 of a wrapping die 58 (FIGURE 4). As can be seen best in FIGURE 4, the wrapping die 58 is mounted on a cross bar member 60 of the main frame 30 and member 60 is laterally adjustable by means of a plurality of ports 62 through 69, and bolts 70 and 72.

Figure 5:
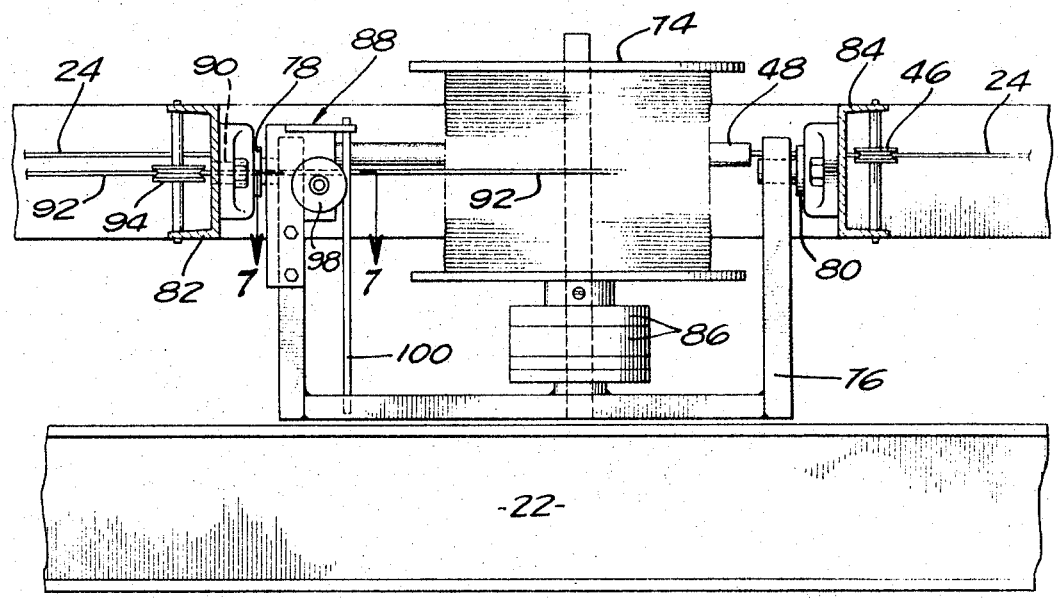
FIGURE 5 is an elevational cross-sectional view taken on the line 5—5 of FIGURE 2b.

Referring now primarily to FIGURES 1, 2 and 5, a drum 74 is rotatably mounted by rotary joints 78 and 80, to members 82 and 84 respectively of main frame 30. Weights 86 are attached to subframe 76 so that it is gravity oriented and therefore maintains a fixed orientation relative to the base 22 as the main frame 30 rotates. A tension device 88 is mounted on the subframe 76 and rotary joint 78 has an aperture 90 formed therethrough. The drum 74 is adapted to contain a quantity of a second insulated conductor 92 that is guided through the tension device 88 and the aperture 90 to a guide pulley 94. The tension device 88 (see FIGURES 5 and 7) comprises a roller 96 which carries a fly wheel 98 for stabilizing the inertia of the roller, and a guide post 100. The second insulated conductor 92 is guided around the post 100, across the roller 96, through the aperture 90 to the guide pulley 94. From guide pulley 94 the second conductor 92 is routed over a guide pulley 102, through guide bushings 104 and 106, across a guide pulley 108 to a second angled guide surface 110 of the wrapping die 58 (see FIGURE 4). The guide surfaces 56 and 110 of the wrapping die 58 may be angled at about 75 degrees, for example, which is substantially the angle at which wires 24 and 92 are guided thereto.

Again referring primarily to FIGURES 1 and 2, a drum 112, adapted to contain a quantity of core material 114, is rotatably mounted on a U-shaped subframe 113. Subframe 113 is connected by rotating joints 116 and 118 to cross bar members 120 and 122 respectively of the main frame 30. Weights 124 are attached to the subframe 113 so that it is gravity oriented and therefore maintains a fixed orientation relative to base 22 as subframe 30 rotates. A tension device 126, similar to device 88 described previously, is mounted on the subframe 113; and rotary joint 116 and the member 120 have an aperture 128 (FIGURE 3) formed therethrough. The cable material 114 is guided through the tension device 126, through the aperture 128, and then through a port 130 of the wrapping die 58.

Figure 3:
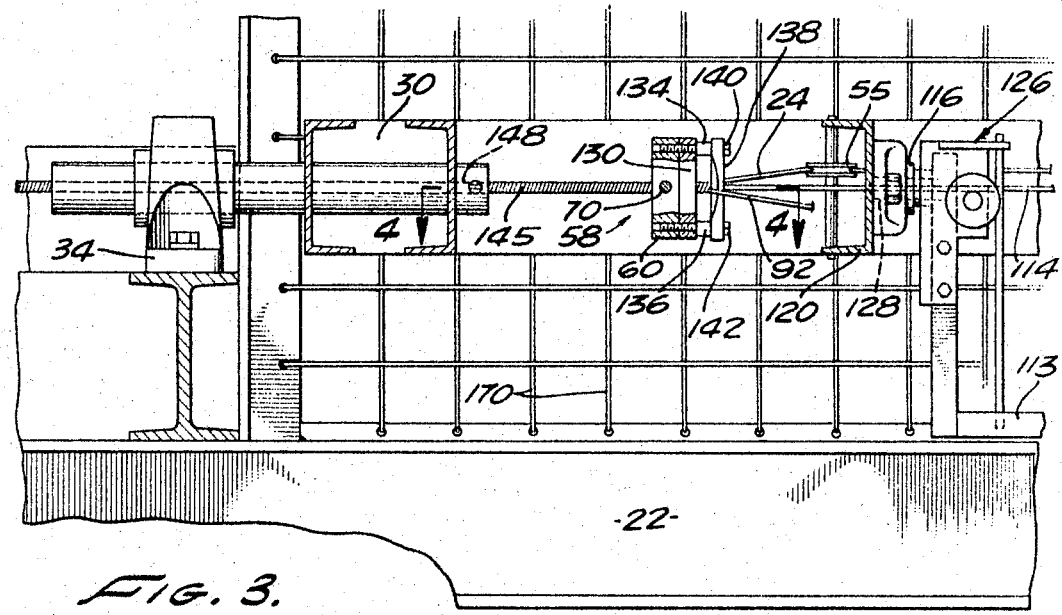

Referring now to FIGURES 3, 4 and 9 as well as FIGURES 1 and 2, the wrapping die 58 comprises a first rectangular member 130 having a tapered aperture 132 therethrough, a pair of hollow cylindrical spacing tubes 134 and 136, a second member 138 of generally rectangular shape with first angled surface 56 and second angled surface 110 and an aperture 139 formed therein. A pair of bolts 140 and 142 secure the members 130 and 138 which are spaced by spacing tubes 134 and 132.

As the main frame 30 rotates, the insulated conductors 24 and 92 are helically wound about the core 114 by the wrapping die 58. The conductors 24 and 92 may be A.W.G. 22, for example, with plastic insulation and nylon covering. However it has been found that the helices formed by the conductors wound on the core material 114 have a smaller lay ratio if a polyimide film such as Kapton, produced by the Du Pont Corporation, or Polysulaphone, produced by the Union Carbide Corporation, is utilized for the insulation material on the conductors 24 and 92.

The wound cable passes through an aperture 144 formed in the frame member 60, and then through a sizing die 146, as is best seen in FIGURE 4. The sizing die 146, which may be a polished tapered tungsten carbide die, is mounted adjacent to a hollow axle 148 of the main frame 30, and is so tapered that the completed cable 145 is compressed to a uniform predetermined diameter.

After passing through the sizing die 146 and the aperture 148, the cable passes over a capstan 150 which is comprised of a drive pulley group 152 and an idler pulley group 154. The driven pulley group 152 is rotated by a gear box 156 in response to a belt 158 driven by a DC motor 160. The speed of the motor 160, and therefore the speed at which the cable is processed through the machine of the subject invention, is determined by an AC (alternating current) to DC converter unit 162 that is manually controllable by a control knob 163.

The cable is guided from the capstan 150 to a suitable conventional transverse winding unit 164, and then to a take-up reel 166. The transverse winding unit 164 is driven by a drive mechanism 168 which is connected to the idler pulley group 154. The take-up reel is driven by a drum 167 which is connected to a motor-pulley belt mechanism 168. The speed of the drive mechanism 169 is slightly higher than the speed of the capstan 150, and slippage occurs between the drum 167 and the take-up reel 166 so that the cable 145 is uniformly wound onto the take-up reel at a substantially constant tension.

In the operation of the machine, in accordance with the principles of the subject invention, the insulated conductors 24 and 92, and the core material 114 are first manually threaded through the machine with the motors 42, 160 and 169 deactivated. The conductor 24 is routed from the drum 20 through the tension device 26, the aperture 27, and across the guide pulleys 44 and 46. From the guide pulley 46 the conductor 24 is threaded through the guide bushing 47, guide tube 48, guide bushings 50 and 52, guide tube 54, and across the guide pulley 55 to the first angled surface 56 of the wrapping die 58. The conductor 92 is routed through tension device 88 and aperture 90 to the guide pulleys 94 and 102. From the guide pulley 102 the conductor 92 is threaded through the guide bushings 104 and 106, over the guide pulley 108 to the second angled guide surface 110 of the wrapping die 58. The core material 114 is directed from the drum 112 through the tension device 126 and the apertures 128, 130 and 132 (FIGURE 9). The conductors 24 and 92 are manually twisted helically about the core 114 and the resulting lead cable assembly is threaded through the sizing die 146 and the aperture 148 of the main frame 30 to the capstan 150. The capstan 150 has four turns of figure eight wind, so as to drive the idler pulley 154 and to have sufficient friction to pull the cable through the machine. From the capstan 150, the lead cable passes around a pulley 161 on the transverse wind unit 164, and is secured to the take-up reel 166.

After the frame member 60 (FIGURE 4) is adjusted to the correct lateral position for a desired helical lay ratio, the machine is ready for operation by the activation of motors 42, 160 and 168. In operation, the main frame 30 is rotated at a high angular rate, for example 500 revolutions per minute. A safety screen 170 is provided to cover the frame 30 for personnel protection.

As the main frame 30 rotates, the conductors 24 and 92 are automatically wound about the core 114 with each adjacent turn of each conductor having a turn of the other conductor interspersed therebetween (see FIGURE 10), and with the pitch of helices being such that each turn of each conductor is nearly perpendicular to the longitudinal axis of the cable core 114. The lay ratio of the cable produced can be less than one-to-one; where the lay ratio is defined as the length of the helix dixided by the pitch diameter or $X/Z$ as shown in FIGURE 10. For best results the core 114, when compressed by the winding of the conductors, should have a diameter substantially the same as the diameter of the helix (in FIGURE 10 the core diameter is shown slightly smaller than Z for clarity). For A.W.G. 22 type conductor with Kapton insulator, a fiberglass core with a diameter of 0.070 inch prior to compression has been found to be satisfactory.

During the operation of the machine the speed of the capstan may be manually adjusted by control knob 163 so as to optimize the resulting cable. If the capstan drive is too fast, the conductors move towards the forward member 138 (FIGURE 4) of wrapping die 58, and undesirable spacings appear between conductor turns. If the capstan drive is too slow, the conductors move toward the rear member 130 of the wrapping die and turns pile up. Therefore the rotational rate of the capstan is manually controlled so that the conductors are wound on the core in the center of the space between members 130 and 138.

A metallic braided shield 72 and an outer cylindrical sheath 174 (FIGURE 10) are applied, at a later stage of processing, to the wound cable by conventional machines utilizing techniques which are well known in the art. Shield 172 is made from a plurality of fine copper wires, half of the wires being wound with one direction of rotation about the cable and the other half with the opposite direction of rotation; the two sets of wires crossing each other substantially prependicular at numerous points, all of the wires being therefore aligned at an angle of about 45 degrees with respect to the longitudinal axis of the cable. The sheath 174 tightly encloses the shield 172, and is made of a plastic material such as polyvinylchloride. A cross-sectional view of the completed low-noise cable is shown in FIGURE 11, and FIG. 12 is a view of the end of the completed cable showing the internal construction of an end assembly 176 with connectors 178 and 180 attached to the conductors 24 and 92 respectively.

Referring now to FIGURE 13, an audio communications system incorporating the cable produced by the machine of the subject invention is shown in block and schematic diagram form. An audio frequency source 182, has an output transformer winding 184 coupled to one end of the conductors 24 and 92. An audio frequency load 186 has an input transformer winding 188 coupled to the other end of the conductors 24 and 92, and the shield 172 is connected to a reference potential, such as ground potential. A plurality of current carrying leads 190 are shown as an example of potential noise signal producing sources.

Thus there has been described a novel and improved machine for manufacturing a low-noise cable that comprises conductors wound helically above a core with a low lay ratio, and which cable exhibits a marked and unexpected improvement in reducing noise signal pick-up. Although but a single preferred embodiment has been described herein, it will be obvious to those skilled in the art that numerous embodiments and modifications within the skill of routine engineering are possible. For example, a plurality of conductors could be wound about the core 114 and the core itself could be composed of tightly wrapped or helically wound conductors.

I claim:

1. A machine for assembling a plurality of insulated conductors wound about a cable core to make a low-noise cable, said machine comprising:
   a base;
   a frame rotatably mounted on said base;
   frame drive means for rotating said frame at a first selected rate;
   a wrapping die mounted on said frame for simultaneously winding the plurality of insulated conductors nearly perpendicular to the longitudinal axis of the core, said die having a port formed therethrough and a plurality of angled surfaces thereon;
   means for feeding the cable core through said port in said die;
   means for feeding each of said plurality of conductors across different ones of said angled surfaces; and
   capstan means for drawing said cable through the die at a second selected rate;
   the relative rates of said frame drive means and said capstan drive means, and the angle of said plurality of angled surfaces being selected so that, in operation of said machine, the conductors are wound on the core at a lay ratio of less than two to one.

2. The machine of claim 1 further comprising:
   means for adjusting the lateral position of said wrapping die with respect to said conductor feed means, whereby the pitch of the helices, formed by the conductors on the core, is variable; and
   a take-up reel mounted on said base so that as the cable is fed from said capstan it is wound onto said take-up reel.

3. A machine for assembling a plurality of insulated conductors wound about a cable core to make a low-noise cable, said machine comprising:
   a base;
   a main frame rotatably mounted on said base;
   frame drive means for rotating said frame at a selected rate;
   a wrapping die mounted on said frame, for helically winding a plurality of conductors on the core so that each turn of each conductor is approximately perpendicular to the longitiudinal axis of the core, said die having a port formed therethrough and a plurality of angled surfaces thereon;
   means for feeding the cable core through said port in said die;
   means for feeding each of said plurality of conductors across different ones of said angled surfaces;
   a cable drive capstan rotatably mounted on said base for drawing said cable through said die;
   capstan drive means for rotating said capstan; and
   control means, coupled to said capstan drive means, for selectively controlling the rotational rate of said cable drive capstan;
   the angle of said plurality of angled surfaces and the rotational rate of said cable drive capstan being selected so that in operation of said machine the conductors are wound onto the core at a lay ratio of less than two to one.

4. The machine of claim 3 further comprising means for adjusting the lateral position of said wrapping die on said main frame, whereby the pitch of the helices formed by said plurality of conductors on said core is variable.

5. The machine of claim 3 further comprising a sizing die, disposed between said wrapping die and said capstan, said sizing die having a port formed therethrough; wherein in operation of said machine, as the cable is drawn through the port in said sizing die the cable is compressed within prescribed diameter ranges.

6. The machine of claim 3 wherein said cable core feeding means and said plurality of conductors feeding means each comprises a tension device for regulating the tension of the core and of said plurality of said conductors, respectively, as the cable is drawn through the machine.

7. The machine of claim 4 wherein said conductor feeding means are so disposed on said main frame, and said means for adjusting the lateral position of said wrapping die possesses sufficient range, so that said plurality of conductors are directed across said plurality of angled surfaces of said wrapping die at substantially the same angle as that of the die surfaces.

8. The apparatus of claim 3 wherein said capstan drive means includes a direct current motor and said control means comprises a variable alternating current to direct current voltage converter.

9. The apparatus of claim 3 wherein said cable core feeding means and said plurality of conductor feeding means each comprises a sub-frame rotatably mounted on said main frame, said sub-frames being weighted and therefore gravity oriented.

10. The apparatus of claim 3 further comprising a take-up reel rotatably mounted on said base; means for rotating said take-up reel at a selected rate; and a transverse winder device mounted on said base between said cable drive capstan and said take-up reel.

11. The apparatus of claim 10 further comprising a slip device connected between said take-up reel and said means for rotating said take-up reel, whereby said cable is wound on said take-up reel with substantially constant tension.

12. The apparatus of claim 3 wherein said cable drive capstan comprises a double pulley arrangement with each pulley having a plurality of grooves on which said cable is wrapped, whereby the friction between the cable and the plurality of pulley grooves is sufficient to pull the cable through the apparatus.

13. The machine of claim 3 wherein said plurality of conductors comprise first and second polyimide film insulated conductors and said wrapping die includes first and second angled surfaces on opposite faces thereof.

References Cited

UNITED STATES PATENTS

| | | |
|---|---|---|
| 1,793,487 | 2/1931 | Johnson. |
| 1,976,821 | 10/1934 | Wiggins. |
| 2,329,130 | 9/1943 | Nelson et al. _____ 57—71 |
| 2,469,565 | 5/1949 | Logan. |

THOMAS H. EAGER, Primary Examiner

U.S. Cl. X.R.

29—203; 57—71